No. 758,695. PATENTED MAY 3, 1904.
C. C. RIOTTE.
AUTOMOBILE.
APPLICATION FILED JAN. 11, 1904.
NO MODEL.
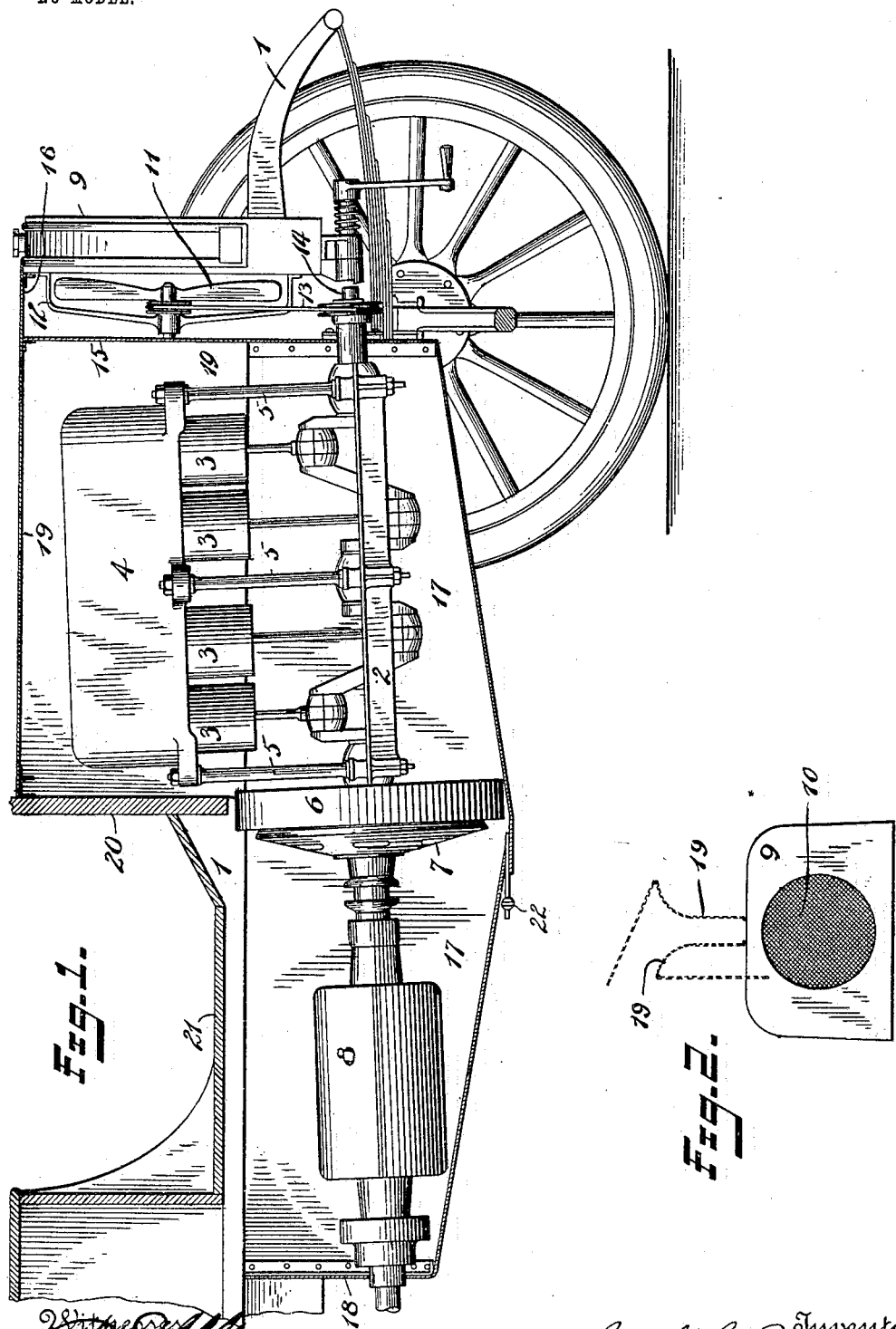

No. 758,695. Patented May 3, 1904.

UNITED STATES PATENT OFFICE.

CARL C. RIOTTE, OF NEW YORK, N. Y.

AUTOMOBILE.

SPECIFICATION forming part of Letters Patent No. 758,695, dated May 3, 1904.

Application filed January 11, 1904. Serial No. 188,568. (No model.)

*To all whom it may concern:*

Be it known that I, CARL C. RIOTTE, a citizen of the United States, residing at New York, New York county, New York State, have invented certain new and useful Improvements in Automobile Construction, of which the following is a full, clear, and exact description.

My invention relates to automobile construction.

The object of my invention is to simplify certain features of construction of an automobile, to protect certain parts hitherto unprotected, and to eliminate certain parts hitherto considered essential, and to in general and in particular improve the features hereinafter mentioned and simplify and render more effective and accessible the motive and transmission mechanisms.

In the drawings, Figure 1 is partly a longitudinal section and partly a side elevation of the forward end of an automobile equipped with an engine of the internal-combustion type. Fig. 2 is a front elevation of the hood and cellular or honeycomb radiating device.

In the particular form of my invention shown in the drawings, 1 represents a portion of the body of the automobile.

2 is an engine-bed, which may be mounted upon or secured to the frame 1 in any suitable manner.

3 3 3 3 are engine-cylinders, which may have a water-jacket 4 in common to all of them. These cylinders are mounted upon rods or pedestals 5 5, which in turn receive their support on the bed 2.

It will be observed that there is an entire absence of any crank-casing, such as has heretofore been common in gas-engines of this type.

6 is the fly-wheel of the engine. 7 is the clutch coacting therewith.

8 is a box in which the transmission mechanism is located, which transmission mechanism is connected with the clutch 7 in any suitable manner.

9 is what is termed a "cellular" or a "honeycomb" radiator. These radiators are usually located in front of the automobile and on an elevation substantially the same as the engine-cylinders.

10 is the cellular portion of the radiator, through which the air passes to cool the liquid within said radiator, the function of which is to keep down the temperature of the cylinders. The cooling liquid is conducted to the jacket 4 by the usual pipes. (Not shown, because the same are immaterial to this invention.)

11 is a fan located directly to the rear of the honeycomb radiator 9 and mounted to rotate in a suitable frame 12. The fan may be driven by a belt 13, connected to the engine-shaft 14.

15 is a closed partition directly behind the fan and directly in front of the engine. This partition serves to prevent the blast of air drawn by the fan through the cellular portion of the radiator from coming in contact with the engine or any of the working parts associated therewith, and it also serves to deflect said air laterally of said fan, so that it will pass downward and under the vehicle. The upper part of the partition 15 is extended, as at 16, to prevent the blast of air from extending upwardly so as to encounter the occupants of the automobile. Said partition 15 also extends downwardly to a plane before the vehicle-frame. Secured to the lower edge of the partition 15 is a curved protecting-shield 17, which covers the under side of the engine, fly-wheel clutch, and all of the working parts associated therewith. This casing 17 also extends rearwardly beyond the fly-wheel and the transmission-box 8 and is connected to the lower edge of a second vertical partition 18, which closes at the rear the chamber thus formed.

19 19 are hinged or removable plates of the hood, which plates overstand the engine and serve to protect it from rain or dust.

20 is a partition to the rear of the engine opposite the partition 15. This partition 20 may comprise the dashboard.

21 is a partition located over the transmission-box 8 and above the rear portion of the curved protecting-shield 17. This partition may comprise the floor-boards of the body.

In the preferred form the curved protecting-shield 17 is lowest at a point underneath the fly-wheel 6, and a suitable drip-cock 22 may be provided, whereby any accumulation of waste oil within the chamber may be drawn off at the low point.

If desired, the side plates 19 19 of the hood above the engine may have double hinges—that is, they may be hinged intermediate their length—in which event the operator may, to gain access to the engine, merely raise one side or the other and allow the second or lower hinged flap to rest on the engine or some convenient shoulder, so as to hold the top flap elevated, as shown in dotted lines in Fig. 2 at the left, or the lower flap may be turned back, as shown in dotted lines in Fig. 2 at the right.

From the foregoing it will be apparent that while I have provided an engine of the internal-combustion type for use on automobiles, the said engine itself being constructed without a crank-case, there is, nevertheless, a crank case or covering present, the shield 17 serving as such in addition to its function as a protecting-shield. The engine, the fly-wheel, the clutch, the transmission mechanism are all enveloped in a dust-proof jacket. This not only serves the useful function of preventing rain, dirt, or mud from coming in contact with any of the working parts, to their obvious detriment, but also muffles any noise of the working parts of the engine. While I have located the radiator directly in front of the engine, the blast of heated air generated by the fan 11 cannot reach the engine or the occupants of the vehicle, since a portion of the hood—to wit, the partition 15—serves as a deflector directing said air-blast downwardly. By the foregoing arrangement not only are all of the parts absolutely protected from in front, at the rear, above, below, and at the sides, but access may be readily gotten to all of the parts by removing the floor-boards 21 or raising the top or sides of the hood 19. The great advantage of enlarging the crank-case, so that it forms practically a hood for the entire engine, driving-wheel, clutch, and gear-box, resides in the fact that access may be readily gotten to all of the cranks, cylinders, and the various bearings. By this arrangement a connecting-rod or piston may be quickly removed, since the operator has free access and ample room in which to work. By eliminating the old integral crank-case the weight of the engine is substantially reduced, which is a matter of substantial importance in engines as applied to automobiles.

What I claim is—

In an automobile, an engine comprising a bed, a cylinder spaced apart therefrom but supported thereby, an open crank-space below said cylinders, a protecting-covering for said crank-space comprising a protective shield below and spaced apart from said bed, a partition closing the front, top and sides of said space.

CARL C. RIOTTE.

Witnesses:
R. C. MITCHELL,
R. S. ALLYN.